(12) United States Patent
Ceroll et al.

(10) Patent No.: US 11,173,557 B2
(45) Date of Patent: Nov. 16, 2021

(54) MITER SAW

(71) Applicant: BLACK & DECKER INC., New Britain, CT (US)

(72) Inventors: Warren A. Ceroll, Owings Mills, MD (US); Torrey R. Lambert, Baltimore, MD (US); Corey Jacob Salemi, Chester, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/122,662

(22) Filed: Dec. 15, 2020

(65) Prior Publication Data

US 2021/0170507 A1 Jun. 10, 2021

Related U.S. Application Data

(63) Continuation of application No. 16/353,689, filed on Mar. 14, 2019, now Pat. No. 10,898,960.

(60) Provisional application No. 62/648,968, filed on Mar. 28, 2018.

(51) Int. Cl.
| | |
|---|---|
| *B23D 45/02* | (2006.01) |
| *B23D 47/02* | (2006.01) |
| *B23D 45/04* | (2006.01) |
| *B27B 5/29* | (2006.01) |

(52) U.S. Cl.
CPC ......... *B23D 45/021* (2013.01); *B23D 45/048* (2013.01); *B23D 47/02* (2013.01); *B27B 5/29* (2013.01); *Y10T 83/7693* (2015.04); *Y10T 83/7697* (2015.04); *Y10T 83/7701* (2015.04)

(58) Field of Classification Search
CPC ............ Y10T 83/7788; Y10T 83/7684; Y10T 83/7693; Y10T 83/7697; Y10T 83/7701; Y10T 83/7705; Y10T 83/8773; Y10T 83/7755; Y10T 83/7776; B23D 45/048; B23D 45/00; B23D 45/024; B23D 45/025; B23D 45/028; B23D 45/04; B23D 45/042; B23D 45/044; B23D 45/046; B23D 45/021; B23D 45/14; B23D 47/02; B27B 5/29; B27B 9/00; B27B 9/02

See application file for complete search history.

(56) References Cited

U.S. PATENT DOCUMENTS

| | | | |
|---|---|---|---|
| 6,658,977 B2* | 12/2003 | Chang ................. | B23D 45/044 83/471.3 |
| 6,758,123 B2* | 7/2004 | Svetlik ..................... | B27B 5/29 83/471.3 |
| 2004/0089125 A1* | 5/2004 | Schoene ................. | B27B 27/04 83/471.3 |

(Continued)

*Primary Examiner* — Phong H Nguyen
(74) *Attorney, Agent, or Firm* — Adan Ayala

(57) ABSTRACT

A miter saw has a base assembly, a table rotatably disposed on the base assembly, a support section rotatably connected to the table, a guide bar fixedly attached to and extending forwardly from the support section, and a saw assembly sliding along the guide bar. The saw assembly is pivotable downwardly for cutting a workpiece disposed on the table. A handle is disposed adjacent to a forward end of the guide bar. The handle is movable between a first position for fixing a rotational position of the support section relative to the table, and a second position for allowing rotational movement of the support section relative to the table.

5 Claims, 5 Drawing Sheets

(56) References Cited

U.S. PATENT DOCUMENTS

2007/0214927 A1* 9/2007 Terashima ................ B27B 5/29
83/477.1
2009/0293691 A1* 12/2009 Gehret ................. B23D 45/048
83/57
2013/0263712 A1* 10/2013 Xu ............................ B27B 5/29
83/471.3

* cited by examiner

MITER SAW

CROSS-REFERENCE TO RELATED APPLICATIONS

The following application is a continuation of U.S. application Ser. No. 16/353,689, filed on Mar. 14, 2019, which in turn claims benefit of Provisional Application No. 62/648,968, filed Mar. 28, 2018, both of which are hereby wholly incorporated by reference.

FIELD OF INVENTION

The present invention relates to miter saws and in particular sliding miter saws.

BACKGROUND OF THE INVENTION

Sliding miter saws are well known in the art. An exemplary sliding miter saw is disclosed in U.S. Pat. No. 7,726,255, which is fully incorporated herein by reference. Such sliding miter saw has a base assembly, a table rotatably disposed on the base assembly, a support section rotatably connected to the table, at least one guide bar fixedly attached to the support section, and a saw assembly sliding along the guide bar(s). The saw assembly can be pivoted downwardly for cutting a workpiece disposed on the table.

A user can rotate the support section relative to the table in order to change the bevel angle, i.e., the angle between the blade plane and the table plane. In order to change the bevel angle, the user must reach behind the support section to pull pin 23 rearwardly (if pin 23 is engaged to the support section), then rotate clamp bolt 74, allowing the rotation of the support section relative to the table. Once the bevel angle has been selected, the user would rotate clamp bolt 74 to fix the rotational position of the support section relative to the table.

Similar arrangements can be found in U.S. Pat. Nos. 8,127,650, 8,161,859, 8,561,513 and 9,174,288, and US Publication No. 2015/0246400, which are hereby incorporated by reference.

It is preferable to provide a mechanism for adjusting the bevel angle without having to reach behind the support section.

SUMMARY

A miter saw having a base assembly, a table rotatably disposed on the base assembly, a support section rotatably connected to the table, a guide bar fixedly attached to and extending forwardly from the support section, a saw assembly sliding along the guide bar, the saw assembly being pivotable downwardly for cutting a workpiece disposed on the table, and a handle disposed adjacent to a forward end of the guide bar, the handle being movable between a first position for fixing a rotational position of the support section relative to the table, and a second position for allowing rotational movement of the support section relative to the table.

DESCRIPTION OF THE DRAWINGS

Preferred embodiments of the invention will now be described, by way of example, with reference to the accompanying drawings, of which:

FIGS. 7A-7B show the bevel detent mechanism in engaged and disengaged positions, respectively; FIGS. 8A-8B show the bevel locking mechanism in unlocked and locked positions, respectively.

DETAILED DESCRIPTION

Figure 1:
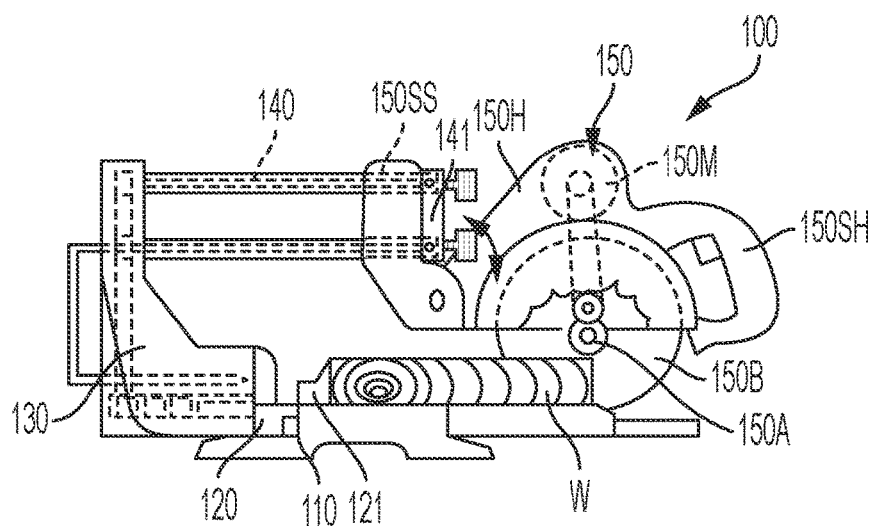
FIG. 1 is a side view of a miter saw according to the invention.

FIG. 1 illustrates a sliding miter saw 100, which has a base assembly 110, a table 120 rotatably disposed on the base assembly 110, a support section 130 rotatably connected to the table 120, at least one guide bar 140 fixedly attached to the support section 130, and a saw assembly 150 sliding along the guide bar(s) 140. If multiple guide bars 140 are used, it is preferable to attach an end cap 141 to the ends of the guide bars 140 in order to ensure parallel alignment between the guide bars 140.

The saw assembly 150 preferably has a saw support section 150SS sliding along the guide bar(s) 140, a saw assembly housing 150H pivotably attached to the saw support section 150SS, a motor 150M supported by the saw assembly housing 150H, and a saw blade 150B disposed on an arbor 150A and driven by motor 150M. Persons skilled in the art will recognize that saw assembly housing 150H (and thus saw blade 150B) may be pivoted downwardly for cutting a workpiece W disposed on the table 120. Saw assembly housing 150H may have a handle 150SH for sliding the saw assembly 150 along the guide bar(s) 140 and for downwardly pivoting the saw assembly housing 150H.

Persons skilled in the art will recognize that workpiece W may be placed against a fence 121 which is preferably attached to base assembly 110 and/or table 120.

Figure 2:
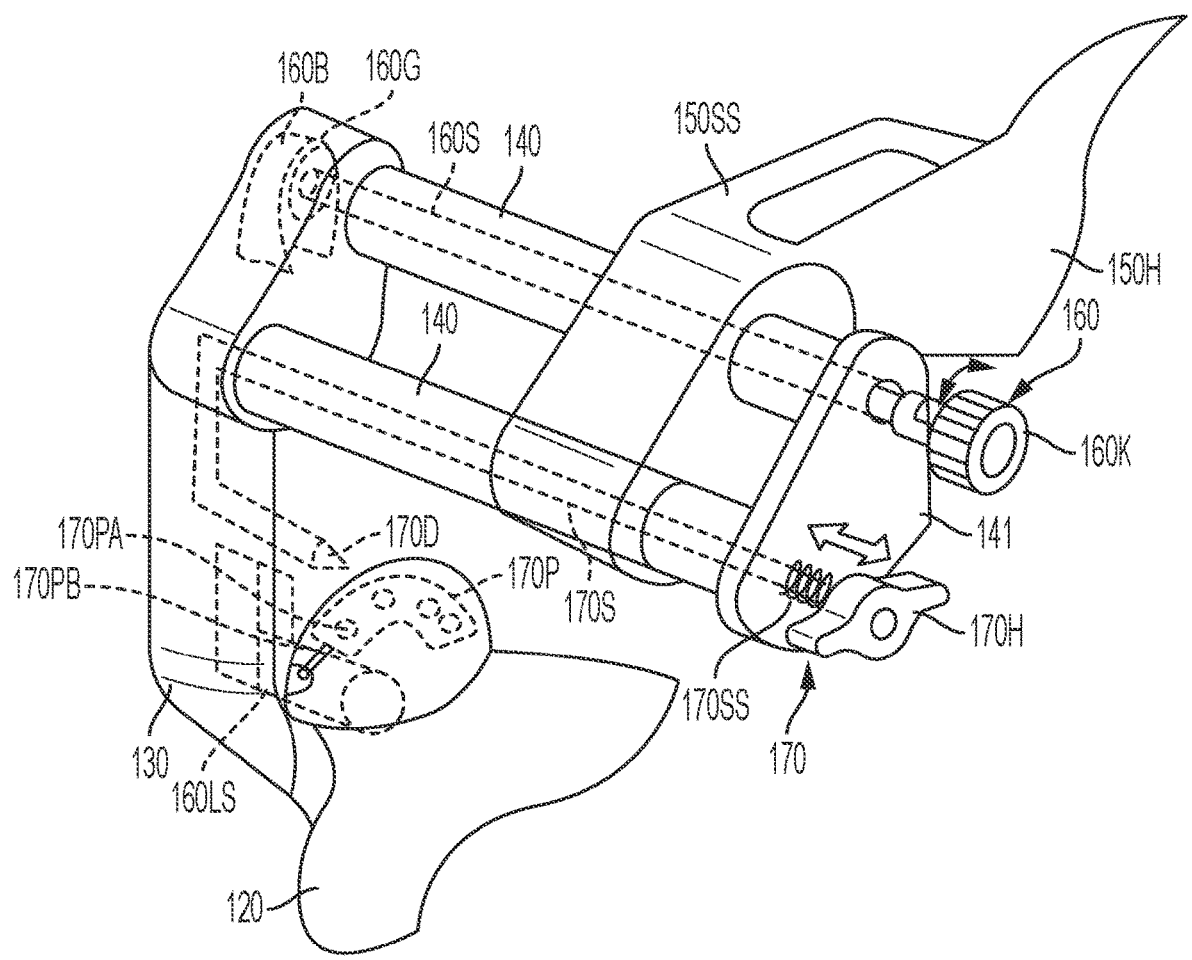
FIG. 2 is a partial perspective view of a first embodiment of the miter saw of FIG. 1.
Figure 3:
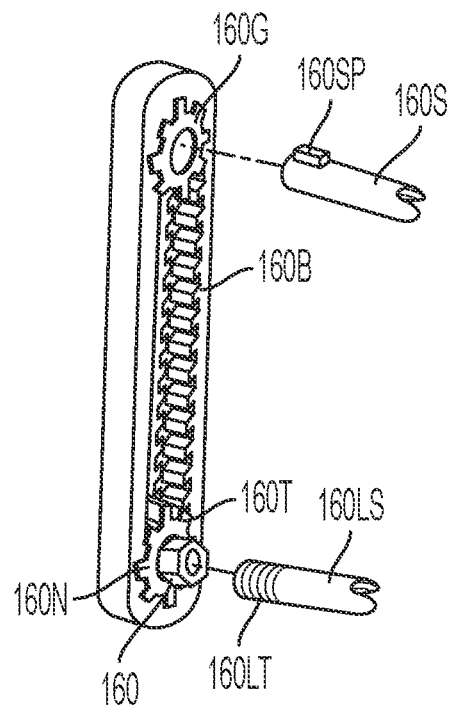
FIG. 3 is a partial exploded view of a first embodiment of a bevel locking mechanism.

FIGS. 2-3 illustrate a first embodiment of bevel locking mechanism 160, which preferably comprises a handle 160K disposed adjacent to the forward end of a guide bar 140 and/or end cap 141, a shaft 160S connected to handle 160K and preferably extending through guide rail 140, and a gear 160G fixedly attached to shaft 160S. Preferably, shaft 160S has a protrusion 160SP to ensure gear 160G rotates along with shaft 160S. Gear 160G preferably drives a belt 160B, which is preferably a toothed belt meshing with the teeth of gear 160G.

Belt 160B in turn may drive a second gear 160T, which preferably slidingly carries a nut 160N, allowing the nut 160N to move in and out of second gear 160T along its rotating axis, while being able to rotate with second gear 160T. Nut 160N may threadingly engage threads 160LT of locking shaft 160LS.

With such arrangement, a user can unlock support section 130 by rotating handle 160K, which in turn rotates shaft 160S and gear 160G. Such rotation causes gear 160T to rotate (via belt 160B). As second gear 160T rotates, nut 160N moves away from table 120 and support section 130. Because the support section 130 is no longer squeezed between nut 160N and table 120, the user can rotate support section 130 relative to table 120, changing the bevel angle.

The user can then lock support section130 in the desired bevel angle by rotating handle 160K, which in turn rotates shaft 160S and gear 160G. Such rotation causes gear 160T to rotate (via belt 160B), causing nut 160N to rotate towards table 120 and support section 130, squeezing support section 130 between nut 160N and table 120, until the support section 130 cannot be rotated relative to table 120, fixing the bevel angle.

Figure 4:
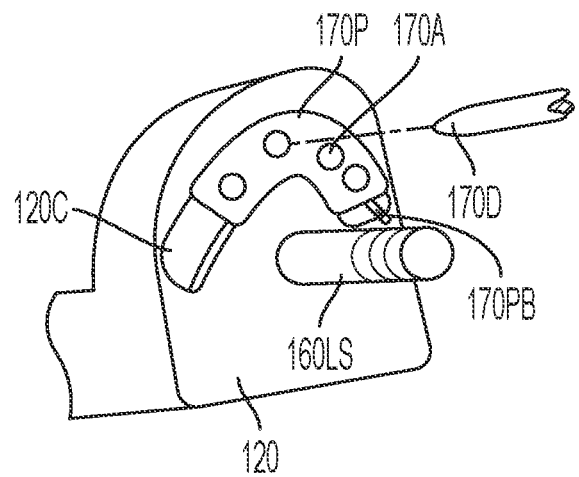
FIG. 4 is a partial exploded view of a first embodiment of a bevel detent mechanism.

FIGS. 2 and 4 illustrate a first embodiment of bevel detent mechanism 170, which preferably comprises a handle 170H disposed adjacent to the forward end of a guide bar 140 and/or end cap 141, and a shaft 170S connected to handle 170H and preferably extending through guide rail 140. Shaft 170S extends through support section 130 and ends in a substantially conical portion 170D. A spring 170SS preferably biases handle 170H away from the end of a guide bar 140 and/or end cap 141.

Conical portion 170D may engage apertures 170PA disposed on table 120. Preferably apertures 170PA are disposed on plate 170P, which may be disposed in a channel 120C on table 120. A bolt 170PB threadingly engaged to table 120 and contacting plate 170P can be used to move plate 170P along channel 120C, thus adjusting the position of plate 170P relative to channel 120C. Preferably apertures 170PA are selected to correspond to desirable or commonly-used bevel angles, such as 0° (i.e., 90° from table plane), 33.9° (left and/or right from the 0° position), etc.

With such arrangement, the user would push handle 170H (and thus shaft 170S) towards support section 130. This will move conical portion 170D away from apertures 170PA, allowing the user to change the bevel angle (if the bevel locking mechanism 160 is unlocked). When the user has changed the bevel angle to one of the commonly-used bevel angles, the user can release handle 170H. Spring 170SS will then push handle 170H (and thus shaft 170S) away from support section 130. This will cause conical portion 170D to enter an aperture 170PA. Due to the conical portion 170D and the movement into aperture 170PA, the support section 130 may slightly rotate to adjust the bevel angle.

Persons skilled in the art shall recognize that bevel detent mechanism 170 may effectively be a bevel locking mechanism for the commonly-used bevel angles. Nonetheless, the user may still use the bevel locking mechanism 160 even if the bevel detent mechanism 170 is in the engaged position.

Figure 5:
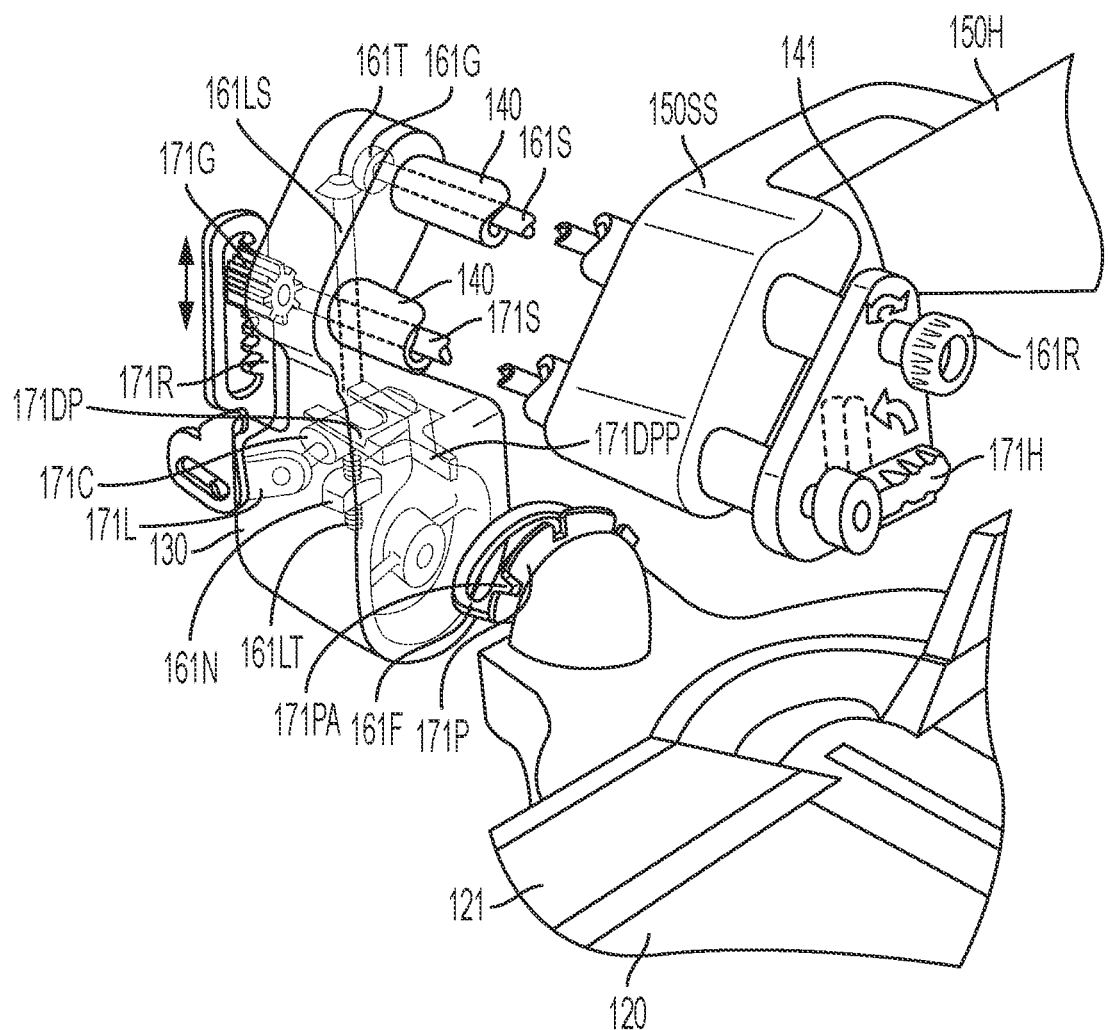
FIG. 5 is a partial perspective exploded view of a second embodiment of the miter saw of FIG. 1.
Figure 6:
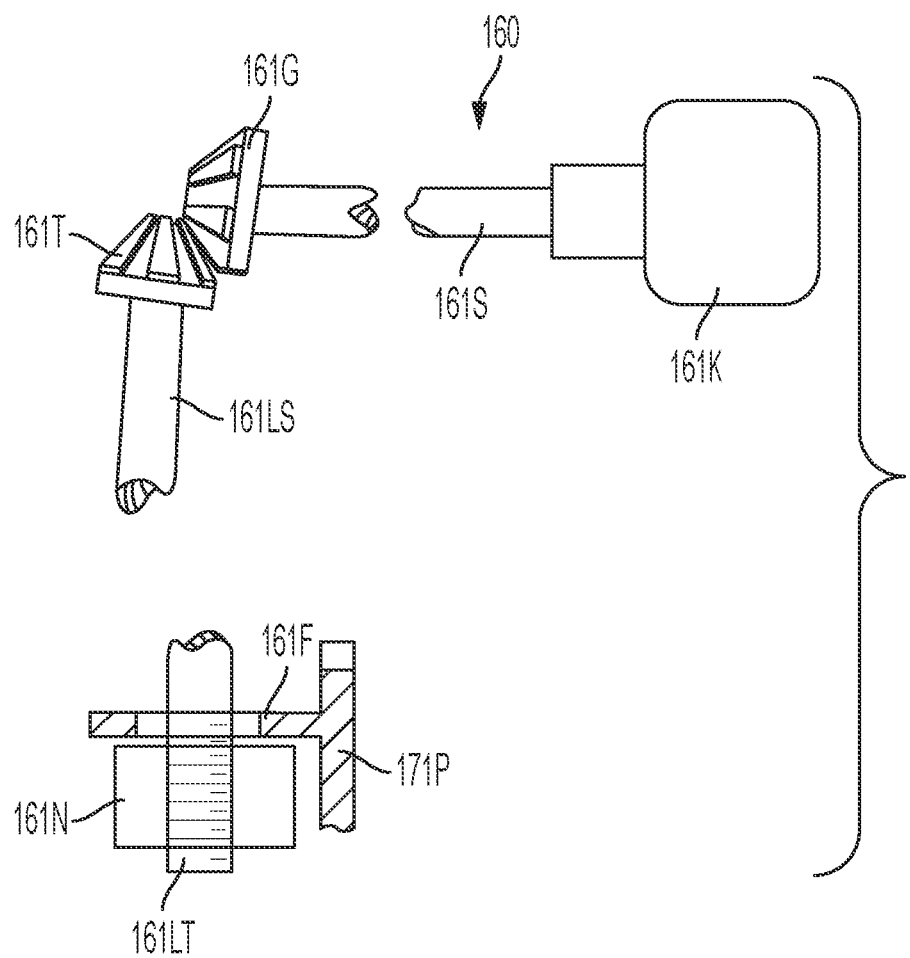
FIG. 6 is a partial side view of a second embodiment of a bevel locking mechanism.

FIGS. 5-6 illustrate a second embodiment of bevel locking mechanism 160, which preferably comprises a handle 161K disposed adjacent to the forward end of guide bar 140 and/or end cap 141, a shaft 161S connected to handle 161K and preferably extending through guide rail 140, and a bevel gear 161G fixedly attached to shaft 161S.

Bevel gear 161G preferably meshes with another bevel gear 161T, which in turn is fixedly attached to locking shaft 161LS. Locking shaft 161LS extends through a flange 161F which is attached to table 120. Locking shaft 161LS preferably has threads 161LT that threading engage nut 161N, which is preferably captured so that it cannot rotate about its axis.

With such arrangement, a user can unlock support section 130 by rotating handle 161K, which in turn rotates shaft 161S and bevel gear 161G. Such rotation causes bevel gear 161T and locking shaft 161LS to rotate. As locking shaft 161LS rotates, the nut 161N is loosened and separated from flange 161F. Now that the support section 130 is unlocked, the user can rotate support section 130 relative to table 120, changing the bevel angle.

The user can then lock support section 130 in the desired bevel angle by rotating handle 161K, which in turn rotates shaft 161S and bevel gear 161G. Such rotation causes bevel gear 161T and locking shaft 161LS to rotate. As locking shaft 161LS rotates, the nut 161N is moved towards and tightening against from flange 161F, fixing the rotational position of support section 130, thus locking in the bevel angle.

Figure 7A:
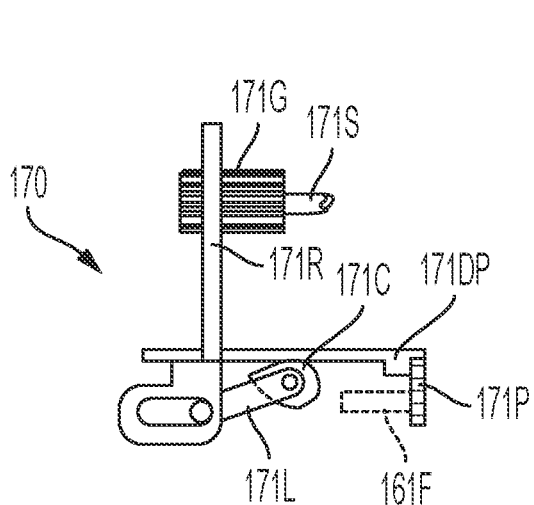
FIGS. 7A-7B are partial side views of a second embodiment of a bevel detent mechanism, where
Figure 7B:
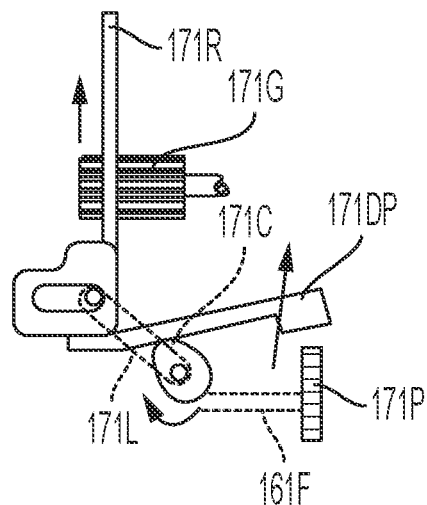

FIGS. 5 and 7A-7B illustrate a second embodiment of bevel detent mechanism 170, which preferably comprises a handle 171H disposed adjacent to the forward end of a guide bar 140 and/or end cap 141, and a shaft 171S connected to handle 171H and preferably extending through guide rail 140. Shaft 171S has a gear 171G fixedly attached to shaft 171S. Gear 171G engages a rack plate 171R, which is connected to cam 171C. A link 171L may connect the rack plate 171R to cam 171C.

Cam 171C in turn may contact a detent plate 171DP. Detent plate 171DP may have a protrusion 171DPP which can engage apertures 171PA disposed on table 120. Preferably apertures 171PA are disposed on plate 171P, which may be adjusted by a bolt or other mechanism. Persons skilled in the art shall recognize that plate 171P may be connected to or unitary with flange 161F.

Preferably apertures 171PA are selected to correspond to desirable or commonly-used bevel angles, such as 0° (i.e., 90° from table plane), 33.9° (left and/or right from the 0° position), etc.

Apertures 171PA and protrusion 171DPP are preferably wedge-shaped to help take up any play therebetween. plate 171P which is attached to table 120.

Persons skilled in the art may recognize that detent plate 171DP may be resilient so as to be biased towards engagement with apertures 171PA. Alternatively a spring (not shown) may be used to bias the detent plate 171DP towards engagement with apertures 171PA.

With such arrangement, the user would rotate handle 171H (and thus shaft 171S and gear 171G). This will cause rack plate 171R to translate, causing cam 171C to rotate from the position shown in FIG. 7A, where detent plate 171DP is engaged with an aperture 171PA, to the position shown in FIG. 7B, where detent plate 171DP is disengaged from aperture 171PA, allowing the user to change the bevel angle (if the bevel locking mechanism 160 is unlocked).

When the user has changed the bevel angle to one of the commonly-used bevel angles, the user can release handle 171H. Detent plate 171DP will move towards aperture 171PA because of its resiliency and/or spring bias. Due to the interacting wedge shapes of aperture 171PA and protrusion 171DPP, the support section 130 may slightly rotate to adjust the bevel angle.

Persons skilled in the art shall recognize that bevel detent mechanism 170 may effectively be a bevel locking mechanism for the commonly-used bevel angles. Nonetheless, the user may still use the bevel locking mechanism 160 even if the bevel detent mechanism 170 is in the engaged position.

Figure 8A:
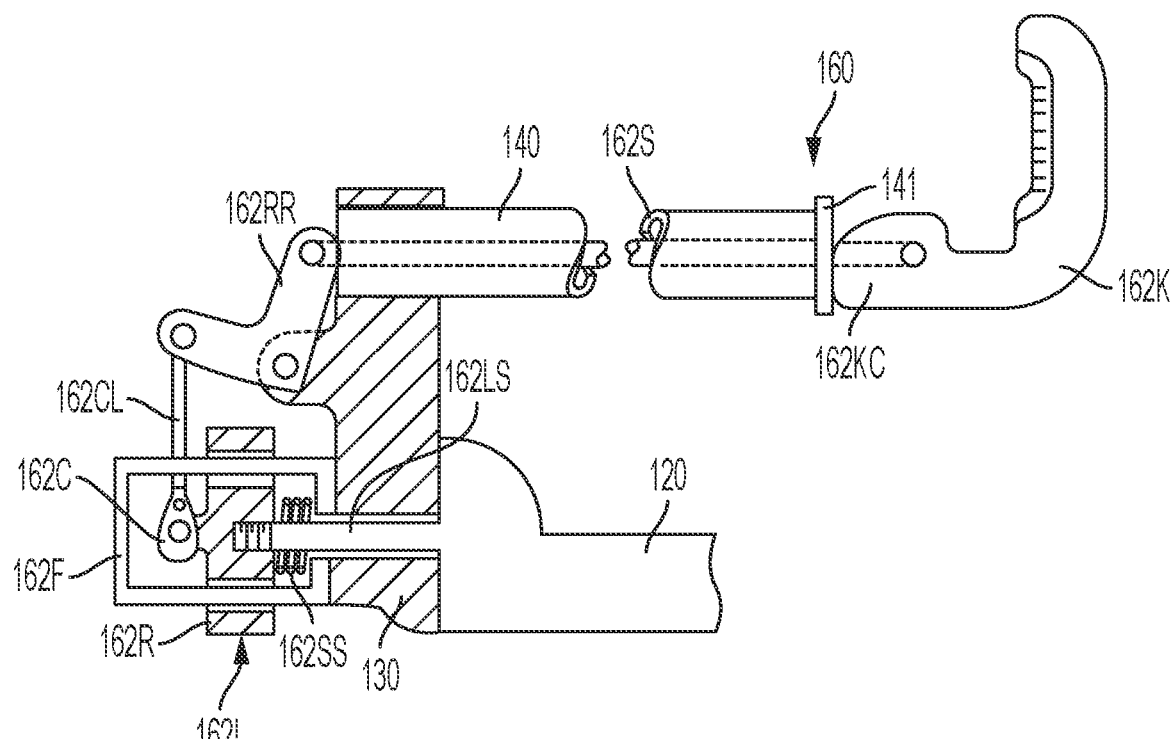
FIGS. 8A-8B are partial side views of a third embodiment of a bevel locking mechanism, where
Figure 8B:
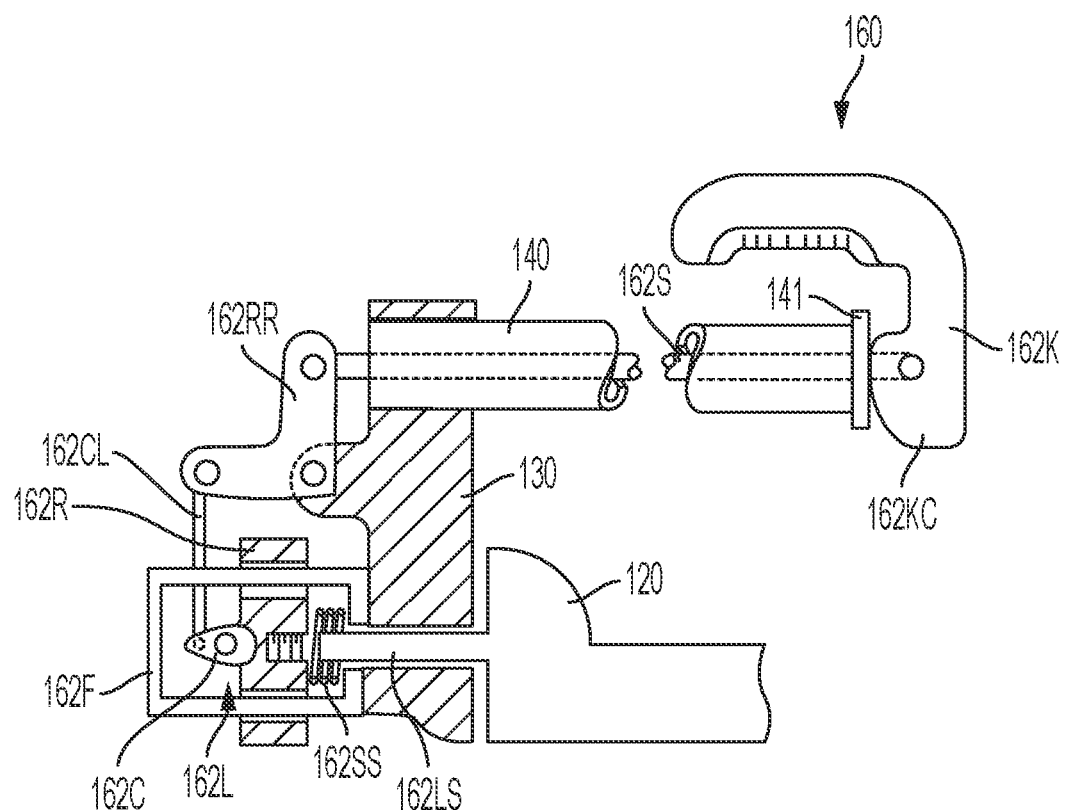

FIGS. 8A-8B illustrate a third embodiment of bevel locking mechanism 160, which preferably comprises a handle 162K disposed adjacent to the forward end of guide bar 140 and/or end cap 141, a shaft 162S pivotably connected to handle 162K and preferably extending through guide rail 140, a lock assembly 162L attached to a locking shaft 162LS which is attached to the table 120.

Lock assembly 162L preferably includes a frame 162F that contacts support section 130. Frame 162F may extend through a cam support 162R, which preferably supports a cam 162C pivotably connected thereto. A spring 162SS may be disposed between frame 162F and cam support 162R.

Shaft 162S may be connected to a link 162RR which may be pivotally attached to support section 130. A cam link 162CL is preferably connected to link 162RR at one end and pivotally connected to cam162C at the other end.

Persons skilled in the art shall recognize that handle 162K may have a cam portion 162KC, to change the effective distance between the point of attachment of shaft 162S to handle 162K and end cap 141. For example, the distance between the two points is larger when the handle 162K is in the position of FIG. 8A and smaller when the handle 162K is in the position of FIG. 8B.

With such arrangement, a user can unlock support section 130 (i.e., move the bevel locking mechanism 160 from the position shown in FIG. 8A to the position shown in FIG. 8B) by rotating handle 162K, which in turn moves shaft 162S along its longitudinal axis, causing link 162RR to rotate, which in turns moves cam link 162CL and thus rotates cam 162C into contact with frame 162F.

As cam 162C continues to rotate, cam 162C pushes cam support 162R towards support section 130, compressing spring 162SS. The rotation of cam 162C also preferably moves frame 162F away from support section 130, separating the support section 130 from table 120, allowing the user to rotate support section 130 relative to table 120, changing the bevel angle.

The user can then lock support section 130 (i.e., move the bevel locking mechanism 160 from the position shown in FIG. 8B to the position shown in FIG. 8A) in the desired bevel angle by rotating handle 162K, which in turn moves shaft 162S and links 162RR, 162CL. Such movement rotates cam 162C, so that it no longer contacts frame 162F. Spring 162SS then pushes cam support 162R away from support section 130, as well as pushing frame 162F into contact with support section 130, fixing the rotational position of support section 130, thus locking in the bevel angle.

Persons skilled in the art should recognize that bevel locking mechanism 160 can be designed so that cam 162C is not in the equilibrium position shown in FIG. 8B. Instead cam 162C may be shaped so that, at any other positions, spring 162SS will move cam support 162R away from support section 130, causing cam 162C to rotate towards the position of FIG. 8A. Because cam 162C is not providing enough force to compress spring 162SS, spring 162SS instead pushes frame 162F towards support section 130, locking the bevel angle. Accordingly, unless the cam 162C is in the equilibrium position, bevel locking mechanism 160 will basically be always in the locked position, even if handle 162K is not in the position shown in FIG. 8A.

It will be understood that the above description and the drawings are examples of particular implementations of the invention, but that other implementations of the invention are included in the scope of the claims.

What is claimed is:

1. A miter saw comprising:
   a base assembly,
   a table rotatably disposed on the base assembly,
   a support section rotatably connected to the table,
   a guide bar fixedly attached to and extending forwardly from the support section,
   a saw assembly sliding along the guide bar, the saw assembly being pivotable downwardly for cutting a workpiece disposed on the table,
   a handle disposed adjacent to a forward end of the guide bar, the handle being movable between a first position for fixing a rotational position of the support section relative to the table, and a second position for allowing rotational movement of the support section relative to the table,
   a shaft connected to the handle and extending through the guide bar,
   a first bevel gear connected to the shaft,
   a second bevel gear meshing with the first bevel gear,
   a locking shaft extending through a flange fixedly attached to the table, and
   a nut threadingly engaged by the locking shaft.

2. A miter saw comprising:
   a base assembly,
   a table rotatably disposed on the base assembly,
   a support section rotatably connected to the table,
   a guide bar fixedly attached to and extending forwardly from the support section,
   a saw assembly sliding along the guide bar, the saw assembly being pivotable downwardly for cutting a workpiece disposed on the table,
   a handle disposed adjacent to a forward end of the guide bar, the handle being movable between a first position for fixing a rotational position of the support section relative to the table, and a second position for allowing rotational movement of the support section relative to the table,
   a shaft connected to the handle and extending through the guide bar,
   a gear fixedly attached to the shaft,
   a rack plate meshing with the gear,
   a cam connected to the rack plate,
   a detent plate contacted by the cam,
   wherein the detent plate is movable between a first position contacting an aperture disposed on a plate connected to the table and a second position not contacting the aperture, whereby, rotational movement of the support section relative to the table is allowed when the detent plate is moved to second position.

3. A miter saw comprising:
   a base assembly,
   a table rotatably disposed on the base assembly,
   a support section rotatably connected to the table,
   a guide bar fixedly attached to and extending forwardly from the support section,
   a saw assembly sliding along the guide bar, the saw assembly being pivotable downwardly for cutting a workpiece disposed on the table,
   a handle disposed adjacent to a forward end of the guide bar, the handle being movable between a first position for fixing a rotational position of the support section relative to the table, and a second position for allowing rotational movement of the support section relative to the table,
   a shaft pivotably connected to the handle and extending through the guide bar,
   a locking shaft attached to the table, and
   a lock assembly attached to the locking shaft.

4. The miter saw of claim 3, wherein the locking assembly comprises:
   a cam support;
   a cam pivotably connected to the cam support, the cam being operationally connected to the handle; and
   a frame contacting the support section and extending through the cam support.

5. The miter saw of claim 4, wherein the locking assembly further comprises a spring disposed between the frame and the cam support.

* * * * *